(12) United States Patent
Susko (10) Patent No.: US 12,179,643 B2
(45) Date of Patent: Dec. 31, 2024

(54) VEHICLE SEATING ASSEMBLY WITH ADJUSTABLE BOLSTER

(71) Applicant: Ford Global Technologies, LLC, Dearborn, MI (US)

(72) Inventor: Thomas J. Susko, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 17/983,792

(22) Filed: Nov. 9, 2022

(65) Prior Publication Data

US 2024/0149755 A1 May 9, 2024

(51) Int. Cl.
*B60N 2/22* (2006.01)
(52) U.S. Cl.
CPC ...................................... *B60N 2/22* (2013.01)
(58) Field of Classification Search
CPC ...................................................... B60N 2/22
See application file for complete search history.

(56) References Cited

U.S. PATENT DOCUMENTS

| | | | |
|---|---|---|---|
| 7,086,700 B2 | 8/2006 | Habedank | |
| 7,140,681 B2 | 11/2006 | McMillen | |
| 7,255,399 B2 | 8/2007 | White et al. | |
| 8,777,316 B2 * | 7/2014 | Shanmugam | B60N 2/206 297/378.12 |
| 9,126,504 B2 * | 9/2015 | Line | B60N 2/986 |
| 10,343,573 B2 * | 7/2019 | Spangler | B64D 11/064 |
| 10,919,423 B2 * | 2/2021 | Susko | B60N 2/7011 |
| 11,076,697 B1 | 8/2021 | Line et al. | |
| 2006/0250008 A1 * | 11/2006 | Kohl | B60N 2/22 297/284.4 |
| 2006/0273644 A1 | 12/2006 | Sturt et al. | |
| 2008/0315654 A1 * | 12/2008 | Boudinot | B60N 2/206 297/378.1 |
| 2011/0121624 A1 * | 5/2011 | Brncick | B60N 2/68 297/284.2 |
| 2014/0265505 A1 * | 9/2014 | Li | B60N 2/20 297/354.1 |

* cited by examiner

*Primary Examiner* — Philip F Gabler
(74) *Attorney, Agent, or Firm* — Vichit Chea; Price Heneveld LLP (57) ABSTRACT

A vehicle seating assembly includes a mounting bracket, a seat, a seatback, a first anchor, a second anchor, and a flexible member. The seat is coupled to the mounting bracket. The seatback is pivotably coupled to the mounting bracket. The first anchor is coupled to the seatback. The second anchor is coupled to the mounting bracket. The flexible member includes a first end coupled to the first anchor and a second end coupled to the second anchor such that the flexible member extends between the first anchor and the second anchor. A position of the first end of the flexible member within the first anchor changes as a function of an angular relationship between the seat and the seatback. A contour of the flexible member changes as a function of the angular relationship between the seat and the seatback.

18 Claims, 7 Drawing Sheets

VEHICLE SEATING ASSEMBLY WITH ADJUSTABLE BOLSTER

FIELD OF THE DISCLOSURE

The present disclosure generally relates to vehicles. More specifically, the present disclosure relates to vehicle seating assemblies.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a vehicle seating assembly includes a mounting bracket, a seat, a seatback, a first anchor, a second anchor, and a flexible member. The seat is coupled to the mounting bracket. The seatback is pivotably coupled to the mounting bracket. The first anchor is coupled to the seatback. The second anchor is coupled to the mounting bracket. The flexible member includes a first end that is coupled to the first anchor and a second end that is coupled to the second anchor such that the flexible member extends between the first anchor and the second anchor. A position of the first end of the flexible member within the first anchor changes as a function of an angular relationship between the seat and the seatback. A contour of the flexible member changes as a function of the angular relationship between the seat and the seatback.

Embodiments of the first aspect of the disclosure can include any one or a combination of the following features:
- the first anchor and the second anchor each include a base portion and a body portion;
- the body portion of the first anchor defines a first aperture that receives a first end of the flexible member;
- the body portion of the first anchor is rotatable relative to the base portion of the first anchor;
- the first aperture is oblong in shape;
- a position of the first end of the flexible member relative to the first aperture is adjusted as the angular relationship between the seat and the seatback is adjusted;
- the body portion of the second anchor defines a second aperture that receives the second end of the flexible member;
- the body portion of the second anchor is rotatable relative to the base portion of the second anchor;
- the seatback is movable between an upright position and a folded position relative to the seat, wherein the folded position corresponds to a minimum contour of the flexible member;
- the folded position aligns the flexible member substantially alongside a frame of the seatback;
- the flexible member is positioned rearward of a forward edge of the frame of the seatback along a length of the flexible member when the seatback is in the folded position; and
- the flexible member is received within a side bolster of the seatback, wherein the contour of the flexible member influences a compressibility of the side bolster of the seatback.

According to a second aspect of the present disclosure, a vehicle seating assembly includes a mounting bracket, a seat, a seatback, a first anchor, a second anchor, and a flexible member. The seat is coupled to the mounting bracket. The seatback is pivotably coupled to the mounting bracket. The seatback is movable between an upright position and a folded position relative to the seat. The first anchor is coupled to the seatback. The second anchor is coupled to the mounting bracket. The first anchor and the second anchor each include a base portion and a body portion. The flexible member includes a first end that is coupled to the first anchor and a second end that is coupled to the second anchor such that the flexible member extends between the first anchor and the second anchor. The body portion of the first anchor defines a first aperture that receives the first end of the flexible member. A position of the first end of the flexible member within the first anchor changes as a function of an angular relationship between the seat and the seatback. A contour of the flexible member changes as a function of the angular relationship between the seat and the seatback. The body portion of the second anchor defines a second aperture that receives the second end of the flexible member. The folded position of the seatback corresponds to a minimum contour of the flexible member.

Embodiments of the second aspect of the present disclosure can include any one or a combination of the following features:
- the body portion of the first anchor is rotatable relative to the base portion of the first anchor;
- the first aperture is oblong in shape;
- a position of the first end of the flexible member relative to the first aperture is adjusted as the angular relationship between the seat and the seatback is adjusted;
- the body portion of the second anchor is rotatable relative to the base portion of the second anchor;
- the folded position of the seatback aligns the flexible member substantially alongside a frame of the seatback;
- the flexible member is positioned rearward of a forward edge of the frame of the seatback along a length of the flexible member when the seatback is in the folded position; and
- the flexible member is received within a side bolster of the seatback, wherein the contour of the flexible member influences a compressibility of the side bolster of the seatback.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
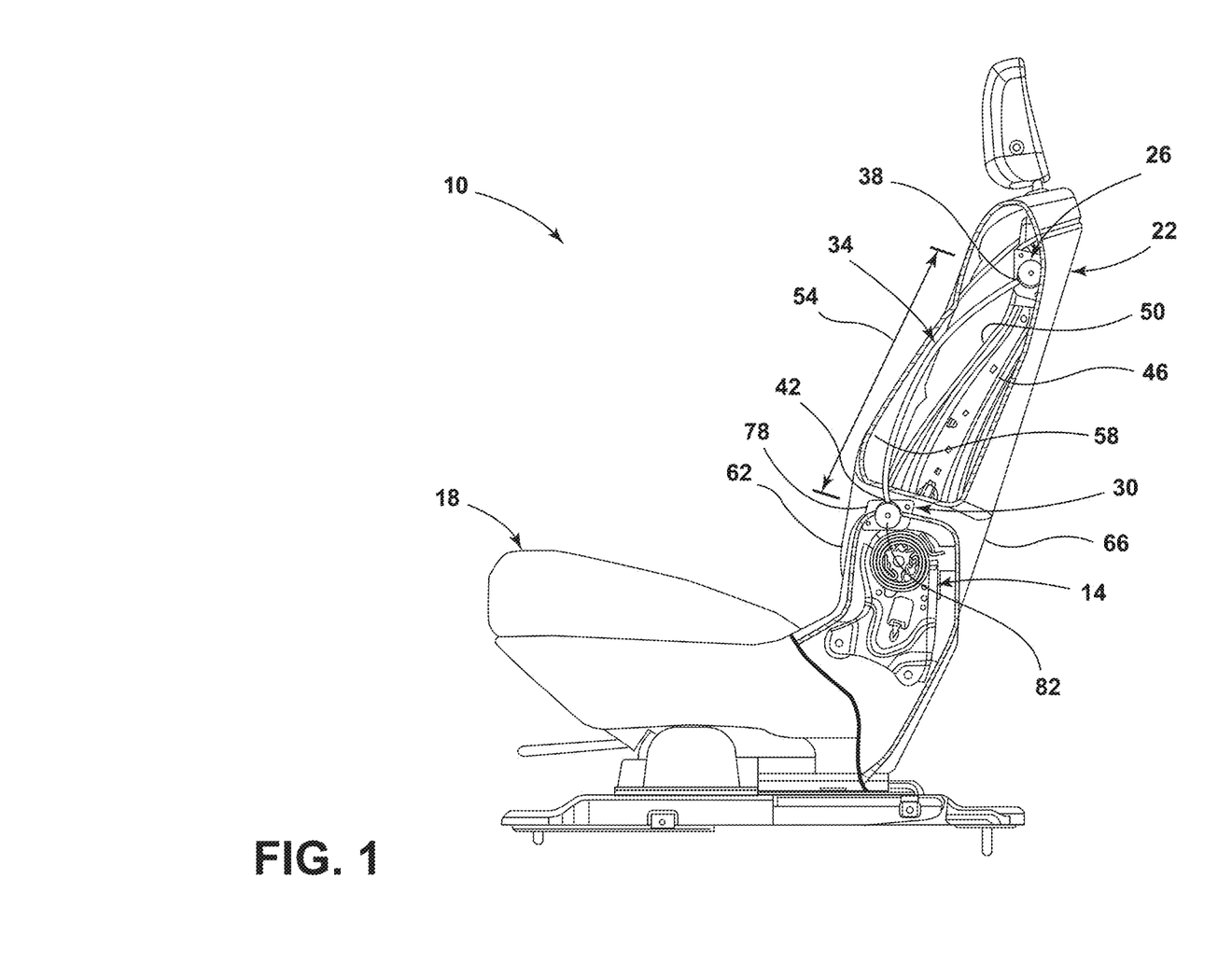
FIG. 1 is a side view of a vehicle seating assembly, illustrating partial cutaways to show a flexible member when the vehicle seating assembly is in an upright position, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7, reference numeral 10 generally designates a vehicle seating assembly. The vehicle seating assembly 10 includes a mounting bracket 14, a seat 18, a seatback 22, a first anchor 26, a second anchor 30, and a flexible member 34. The seat 18 is coupled to the mounting bracket 14. The seatback 22 is pivotably coupled to the mounting bracket 14. The first anchor 26 is coupled to the seatback 22. The second anchor 30 is coupled to the mounting bracket 14. The flexible member 34 includes a first end 38 coupled to the first anchor 26 and a second end 42 coupled to the second anchor 30 such that the flexible member 34 extends between the first anchor 26 and the second anchor 30. A position of the first end 38 of the flexible member 34 within the first anchor 26 may change as a function of an angular relationship between the seat 18 and the seatback 22. A contour of the flexible member 34 may change as a function of the angular relationship between the seat 18 and the seatback 22.

Figure 2:
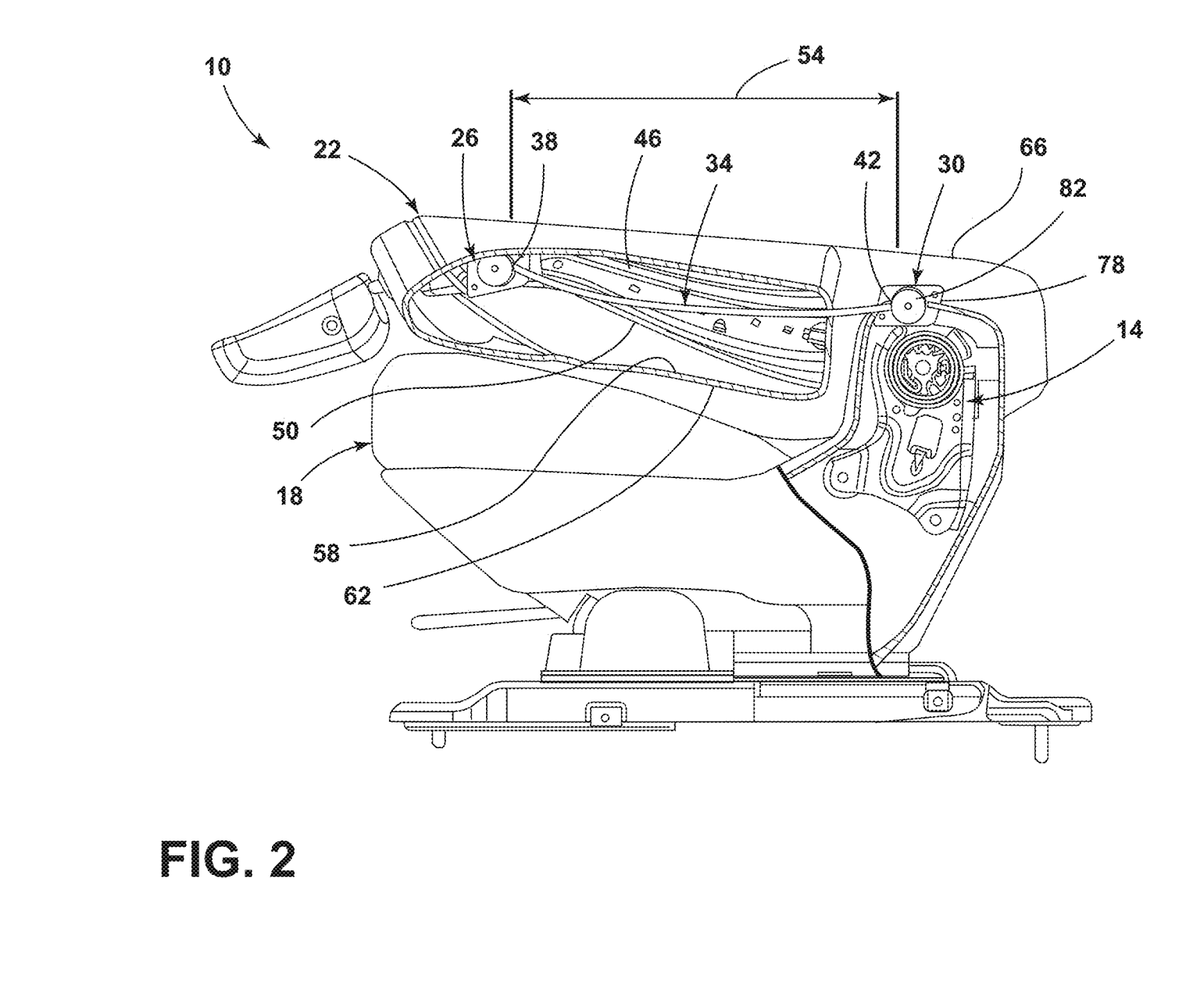
FIG. 2 is a side view of the vehicle seating assembly, illustrating partial cutaways to show the flexible member when the vehicle seating assembly is in a folded position.

Referring again to FIGS. 1 and 2, the seatback 22 is movable between an upright position (FIG. 1) and a folded position (FIG. 2) relative to the seat 18. The folded position of the seatback 22 can correspond to a minimum contour of the flexible member 34. In various examples, the upright position of the seatback 22 may represent a maximum contour of the flexible member 34. The folded position of the seatback 22 aligns the flexible member 34 substantially along a frame 46 of the seatback 22. For example, as shown in FIG. 2, the flexible member 34 may be positioned rearward of a forward edge 50 of the frame 46 of the seatback 22 along a length 54 of the flexible member 34 when the seatback 22 is in the folded position. Said another way, when the seatback 22 is in the folded position, the flexible member 34 may retract toward the frame 46 such that the frame 46 is immediately adjacent to the flexible member 34 along a substantial portion, or an entirety, of the length 54 of the flexible member 34. In contrast, when the seatback 22 is in the upright position, the flexible member 34 may extend away from the frame 46 such that the frame 46 is not immediately adjacent to the flexible member 34 along a substantial portion of the length 54 of the flexible member 34. In some examples, the frame 46 of the seatback 22 may not be immediately adjacent to the flexible member 34 along an entirety of the length 54 of the flexible member 34 when the seatback 22 is in the upright position.

Referring further to FIGS. 1 and 2, in the upright position of the seatback 22, the flexible member 34 may be received within a side bolster 58 of the seatback 22. For example, the flexible member 34 may be received within a channel defined by foam of the side bolster 58. The foam can be positioned between a trim cover 62 of the seatback 22 and the flexible member 34. Additionally, or alternatively, the foam may be positioned between the trim cover 62 and the frame 46 of the seatback 22. The contour of the flexible member 34 can influence a compressibility of the side bolster 58 of the seatback 22. For example, when the seatback 22 is in the upright position, the flexible member 34 can provide structural support to the foam and/or the trim cover 62 of the side bolster 58. Accordingly, the flexible member 34 may increase a rigidity of the side bolster 58 when the seatback 22 is in the upright position. As the seatback 22 is transitioned from the upright position toward the folded position, the flexible member 34 gradually retracts from the side bolster 58 toward the frame 46. With the flexible member 34 gradually receding from the side bolster 58, as the side bolster 58 contacts the seat 18, the side bolster 58 may compress or otherwise give way. Accordingly, a distance between the frame 46 of the seatback 22 and the seat 18 may be less when the flexible member 34 is retracted from the side bolster 58 when compared to alternative seating assemblies that are not provided with the flexible member 34 discussed herein.

Referring yet again to FIGS. 1 and 2, by increasing a compressibility of the side bolster 58 when the seatback 22 is in the folded position, the vehicle seating assembly 10 may be capable of occupying a smaller volume when in the folded position and/or providing a more flat rear surface 66 of the seatback 22 when compared to alternative seating assemblies that may not be provided with a side bolster having the compressibility discussed herein. It can be beneficial in vehicle settings to provide the vehicle seating assembly 10 with the capability of folding as flat as possible to provide a substantially flat surface upon which cargo may be placed within a cargo area, passenger compartment, and/or cabin of the vehicle.

Figure 3A:
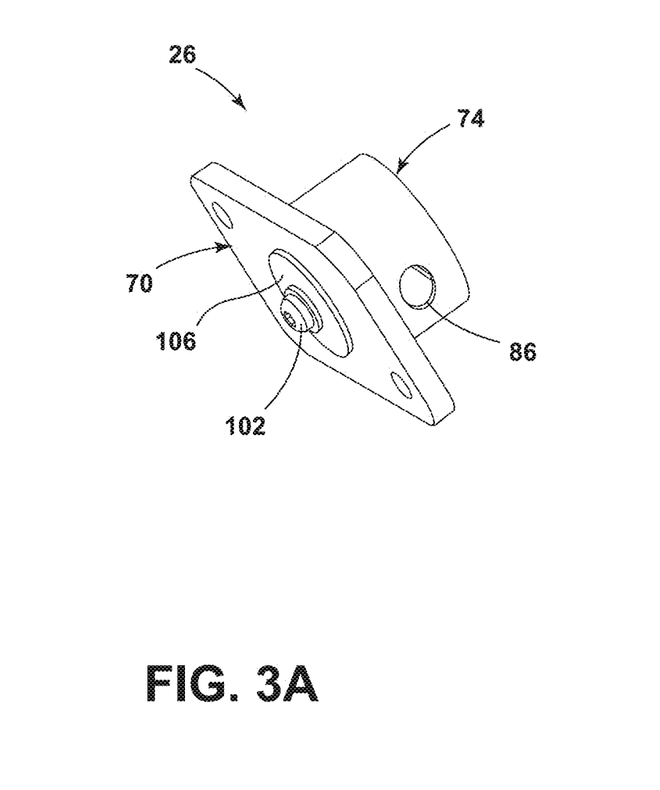
FIG. 3A is a bottom perspective view of a first anchor, according to one example.
Figure 3B:
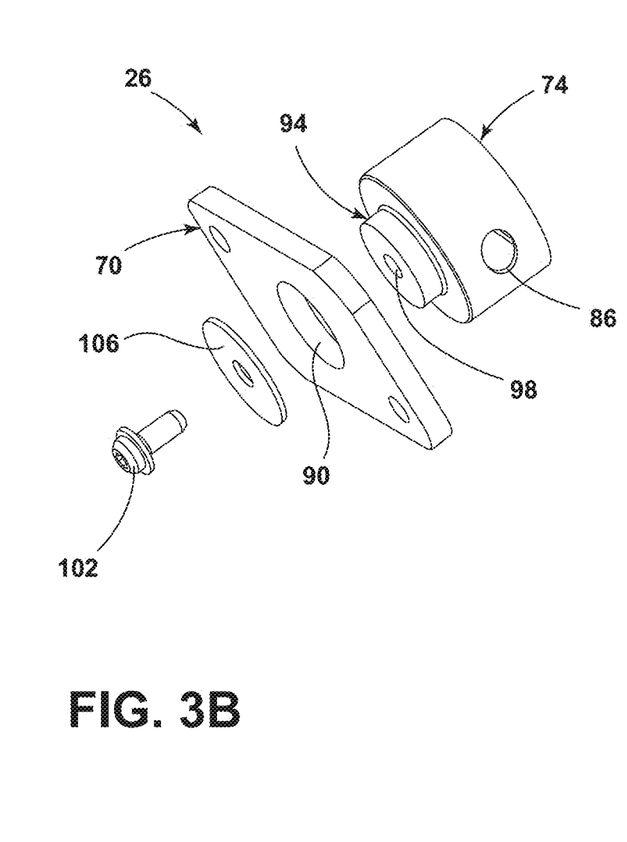
FIG. 3B is an exploded bottom perspective view of the first anchor of FIG. 3A, illustrating various components thereof, according to one example.

Referring now to FIGS. 3A and 3B, the first anchor 26 is depicted according to one example. In some examples, the second anchor 30 may be provided with the structures depicted in FIGS. 3A and 3B. The first anchor 26 includes a base portion 70 and a body portion 74. Similarly, the second anchor 30 includes a base portion 78 and a body portion 82 (see FIGS. 1 and 2). The body portion 74 of the first anchor 26 defines a first aperture 86 that receives the first end 38 of the flexible member 34. In the depicted example, the base portion 70 of the first anchor 26 and/or the base portion 78 of the second anchor 30 defines a hole 90. A protrusion 94 that extends from the body portion 74 of the first anchor 26 and/or the body portion 82 of the second anchor 30 is received within the hole 90 defined by the base portion 70. In such examples, the body portion 74 may be rotatable relative to the base portion 70. Similarly, when the second anchor 30 is so arranged, the body portion 82 may be rotatable relative to the base portion 78.

Referring again to FIGS. 3A and 3B, in some examples, the protrusion 94 may define a fastener aperture 98 that is configured to receive a fastener 102. The fastener 102 engages with the fastener aperture 98 in a manner that couples the base portion 70 and the body portion 74 while permitting rotational motion of the body portion 74 relative to the base portion 70. The fastener 102 may be any suitable fastener including, but not limited to, rivets, bolts, screws, and the like. In the depicted example, the fastener 102 may be a bolt. Accordingly, an interior circumference of the fastener aperture 98 may define threads therein that correspond with threads defined by an exterior surface of a shaft of the fastener 102. Depending upon a particular example of the first anchor 26 and/or the second anchor 30, a washer 106 may be provided that is positioned between an underside of the base portion 70 and the fastener 102. In such an example, the washer 106 may make up a difference in sizing of the hole 90 and the fastener 102. The washer 106 may provide a bearing surface that the fastener 102 bears against after coupling has been accomplished between the base portion 70 and the body portion 74. In various examples, the washer 106 may be made from a low friction material.

Referring further to FIGS. 3A and 3B, the body portion 74 may be capable of rotating through 360° of rotation relative to the base portion 70. However, a functional range of motion of the body portion 74 relative to the base portion 70 may be limited by an extent of rotation of the seatback 22 relative to the seat 18. Said another way, while the body portion 74 may be capable of rotating relative to the base portion 70 through an angular displacement of up to 360°, the angular displacement of the body portion 74 relative to the base portion 70 when the seatback 22 is transitioned from the upright position to the folded position may be 90° or less. For example, the angular displacement of the body portion 74 relative to the base portion 70 when comparing the upright position of the seatback 22 to the folded position of the seatback 22 may be less than about 90°, less than about 80°, less than about 70°, less than about 60°, less than about 50°, less than about 40°, less than about 30°, less than about 20°, less than about 10°, and/or combinations or ranges thereof. In some examples, the range of motion of the body portion 74 relative to the base portion 70 may be limited with physical stops or physical interferences that prevent rotation of the body portion 74 beyond such structures. In such an example, the physical stop or physical interference can be positioned to induce further compression of the flexible member 34 and a corresponding increase in the contour of the flexible member 34 at desired point(s) along a travel path of the seatback 22.

Figure 4:
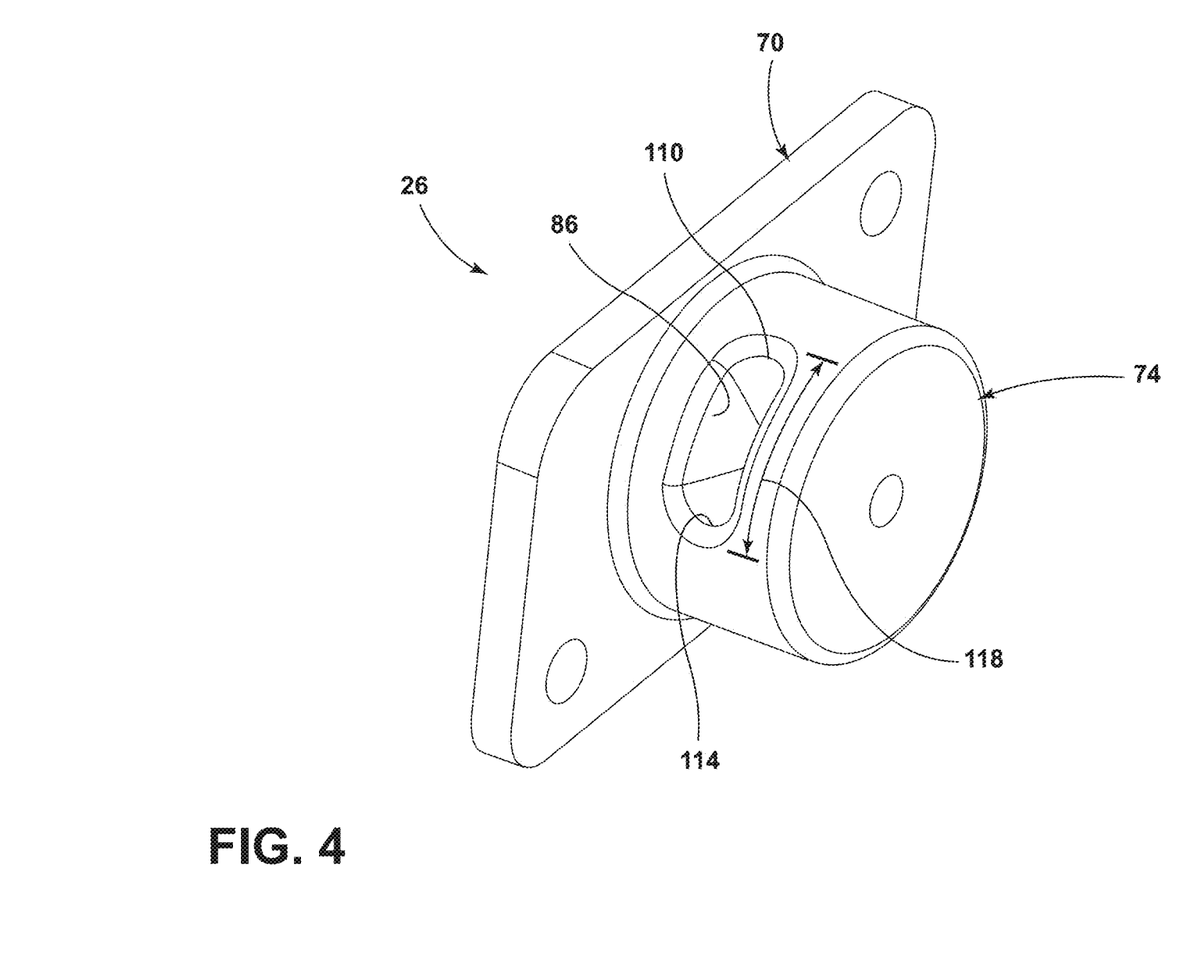
FIG. 4 is a side perspective view of the first anchor, illustrating a first aperture defined therein, according to one example.

Referring to FIG. 4, the first aperture 86 may be oblong in shape. In such examples, the base portion 70 and the body portion 74 may be fixedly coupled to one another such that the body portion 74 is incapable of rotation relative to the base portion 70. For example, the body portion 74 may be welded to the base portion 70 or the base portion 70 and the body portion 74 may be unitarily formed. In examples where the body portion 74 does not rotate relative to the base portion 70, the oblong shape of the first aperture 86 can provide freedom of movement of the first end 38 of the flexible member 34 as the seatback 22 is transitioned between the upright position and the folded position. For example, when the seatback 22 is in the upright position, the flexible member 34 may directly contact an upper extreme 110 of the first aperture 86. In such examples, when the seatback 22 is in the folded position, the flexible member 34 may directly contact a lower extreme 114 of the first aperture 86. An arc length 118 of the first aperture 86 may correspond with an angular displacement of the first end 38 of less than about 90°, less than about 80°, less than about 70°, less than about 60°, less than about 50°, less than about 40°, less than about 30°, less than about 20°, less than about 10°, and/or combinations or ranges thereof.

Figure 5:
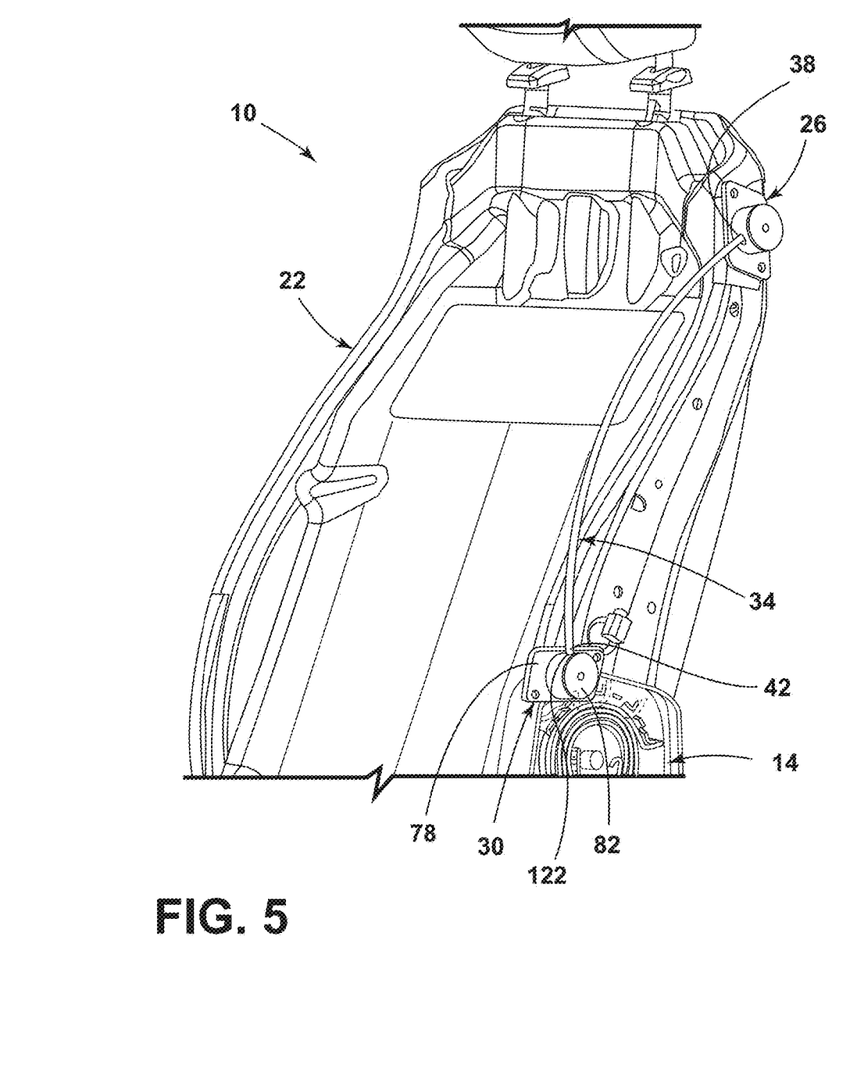
FIG. 5 is a side perspective view of the vehicle seating assembly, illustrating a position of the flexible member and the first anchor while the vehicle seating assembly is in the upright position, according to one example.
Figure 6:
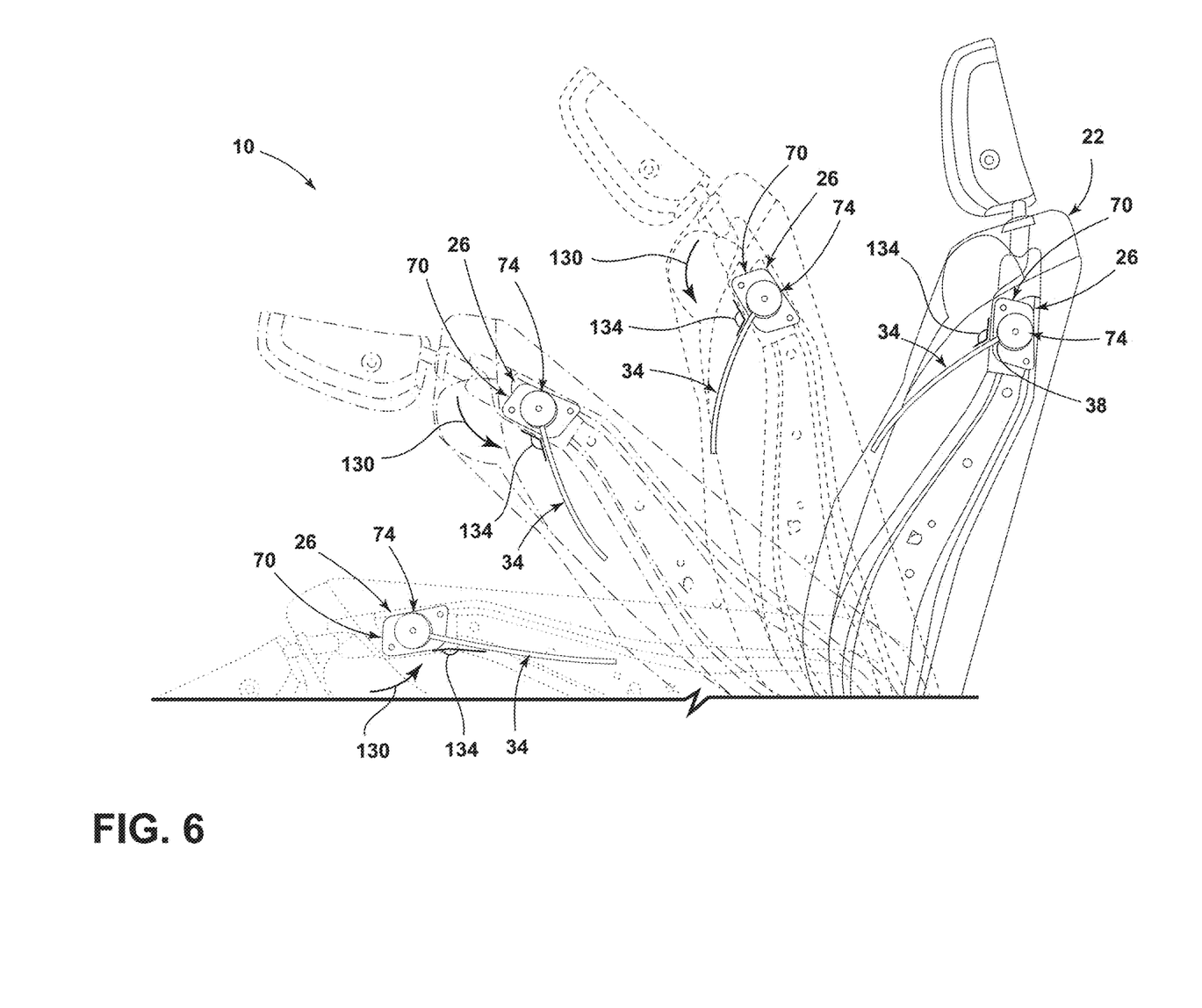
FIG. 6 is a side view of the vehicle seating assembly, illustrating a progressive transition of the vehicle seating assembly from the upright position toward the folded position, according to one example.
Figure 7:
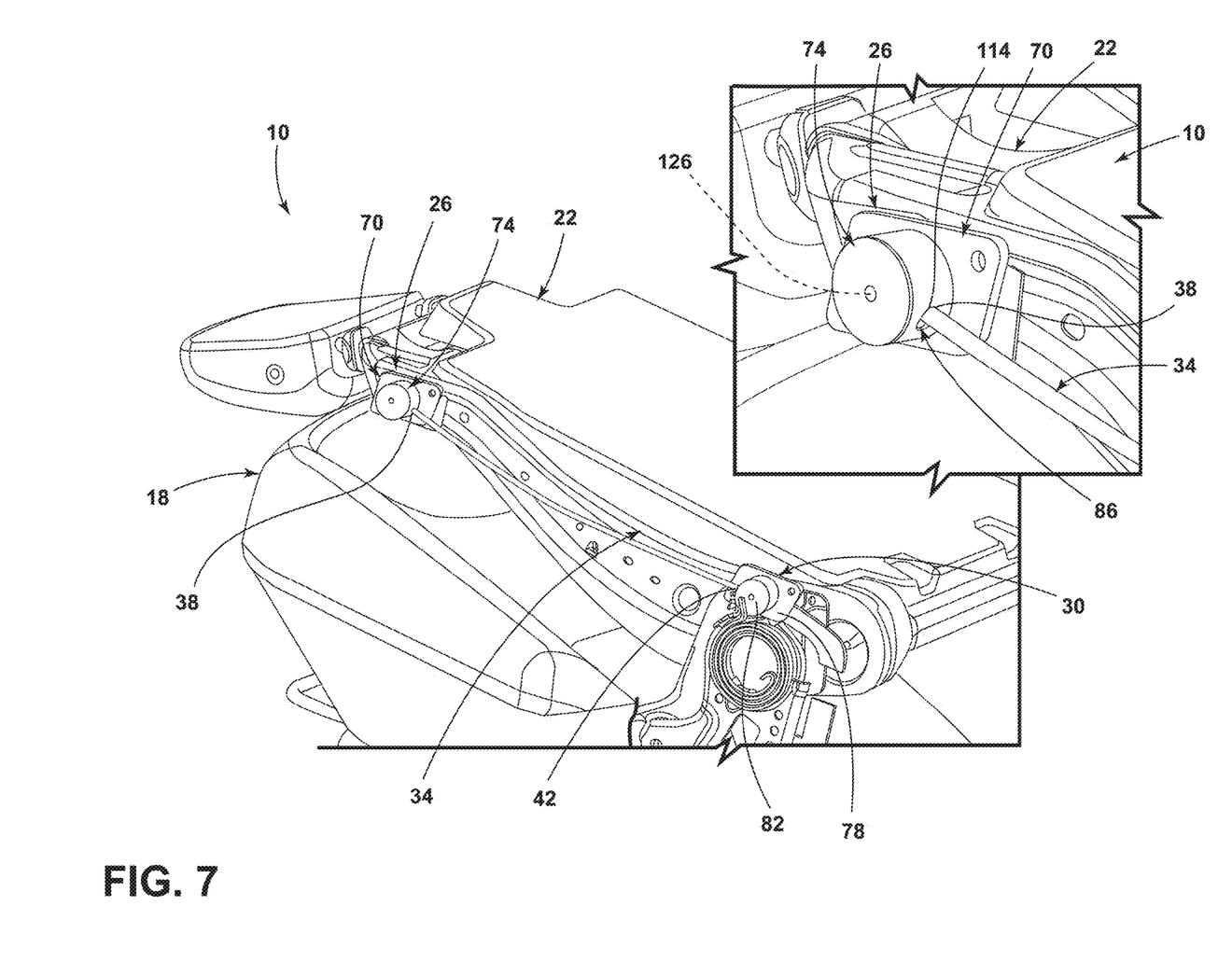
FIG. 7 is a rear perspective view of the vehicle seating assembly, illustrating the position of the flexible member and the first anchor while the vehicle seating assembly in the folded position.

Referring now to FIGS. 5-7, a transition of the seatback 22 from the upright position toward the folded position is depicted for an example where the first anchor 26 is provided with a rotatable body portion 74. As shown in FIG. 5, the seatback 22 is in the upright position and the flexible member 34 assumes a pronounced arcuate shape that extends outwardly from the frame 46 of the seatback 22. As can also be seen in FIG. 5, the flexible member 34 may contact the upper extreme 110 of the first aperture 86 when the seatback 22 is in the upright position. Said another way, the flexible member 34 may be associated with the upper extreme 110 of the first aperture 86 when the seatback 22 is in the upright position.

Referring again to FIGS. 5-7, in various examples, a degree of rotation of the body portion 74 of the first anchor 26 relative to the base portion 70 may be limited such that the range of motion of the body portion 74 is less than 360°. In such examples, it may be beneficial to limit the degree of rotation of the body portion 74 relative to the base portion 70 so that the flexible member 34 is provided with a stop against which it may bear and thereby impart the pronounced arcuate shape depicted in FIG. 5. The body portion 82 of the second anchor 30 may be fixed relative to the base portion 78 of the second anchor 30. Alternatively, the body portion 82 of the second anchor 30 may be rotatable relative to the base portion 78. The discussions provided herein relative to the first anchor 26 may apply, in whole or in part, to the second anchor 30. The body portion 82 of the second anchor 30 defines a second aperture 122 that receives the second end 42 of the flexible member 34.

Referring further to FIGS. 5-7, as the seatback 22 is transitioned from the upright position toward the folded position, the position of the first end 38 of the flexible member within the first anchor 26 changes as a function of the angular relationship between the seat 18 and the seatback 22. The adjustment of the position of the first end 38 of the flexible member 34 within the first anchor 26 may occur independent of whether the body portion 74 is rotatable relative to the base portion 70. For example, when the first aperture 86 is oblong in shape and the body portion 74 is fixed relative to the base portion 70, the first end 38 of the flexible member 34 may move within a chamber 126 defined by the body portion 74 as the seatback 22 is transitioned between the upright position and the folded position. Such movement of the first end 38 of the flexible member 34 within the chamber 126 defined by the body portion 74 may correspond with the adjustment of the flexible member 34 contacting the upper extreme 110 or the lower extreme 114 of the first aperture 86.

Referring still further to FIGS. 5-7, in examples where the body portion 74 is rotatable relative to the base portion 70, the position of the first end 38 of the flexible member 34 within the first anchor 26 changes as a function of the angular relationship between the seat 18 and the seatback 22, as indicated by arrow 130 in FIG. 6. For example, as the base portion 70 of the first anchor 26 is mounted to the seatback 22, an angle 134 between the flexible member 34 and the base portion 70 may be referred to in discussing and/or depicting the change in the angular relationship between the flexible member 34 and the seatback 22. In the depicted example of FIG. 6, the angle 134 may become increasingly obtuse as the seatback 22 is transitioned from the upright position toward the folded position. In some examples, the angle 134 may approach 180° as the seatback 22 approaches the folded position. As discussed above, the contour of the flexible member 34 may change as a function of the angular relationship between the seat 18 and the seatback 22. The change in the contour of the flexible member 34 as the angular relationship between the seat 18 and the seatback 22 is adjusted can correspond, or otherwise be the result of, the adjustment in the angle 134 and/or the adjustment of the first end 38 relative to the first aperture 86.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
  a mounting bracket;
  a seat that is coupled to the mounting bracket;
  a seatback pivotably coupled to the mounting bracket;
  a first anchor coupled to the seatback;
  a second anchor coupled to the mounting bracket; and
  a flexible member having a first end coupled to the first anchor and a second end coupled to the second anchor such that the flexible member extends between the first anchor and the second anchor, wherein a position of the first end of the flexible member within the first anchor changes as a function of an angular relationship between the seat and the seatback, wherein a contour of the flexible member changes as a function of the angular relationship between the seat and the seatback, and wherein the flexible member is received within a side bolster of the seatback, and wherein the contour of the flexible member influences a compressibility of the side bolster of the seatback.

2. The vehicle seating assembly of claim 1, wherein the first anchor and the second anchor each comprise a base portion and a body portion.

3. The vehicle seating assembly of claim 2, wherein the body portion of the first anchor defines a first aperture that receives the first end of the flexible member.

4. The vehicle seating assembly of claim 3, wherein the body portion of the first anchor is rotatable relative to the base portion of the first anchor.

5. The vehicle seating assembly of claim 3, wherein the first aperture is oblong in shape.

6. The vehicle seating assembly of claim 5, wherein a position of the first end of the flexible member relative to the first aperture is adjusted as the angular relationship between the seat and the seatback is adjusted.

7. The vehicle seating assembly of claim 3, wherein the body portion of the second anchor defines a second aperture that receives the second end of the flexible member.

8. The vehicle seating assembly of claim 7, wherein the body portion of the second anchor is rotatable relative to the base portion of the second anchor.

9. The vehicle seating assembly of claim 1, wherein the seatback is movable between an upright position and a folded position relative to the seat, and wherein the folded position corresponds to a minimum contour of the flexible member.

10. The vehicle seating assembly of claim 9, wherein the folded position aligns the flexible member substantially alongside a frame of the seatback.

11. The vehicle seating assembly of claim 10, wherein the flexible member is positioned rearward of a forward edge of the frame of the seatback along a length of the flexible member when the seatback is in the folded position.

12. A vehicle seating assembly, comprising:
  a mounting bracket;
  a seat that is coupled to the mounting bracket;
  a seatback pivotably coupled to the mounting bracket, wherein the seatback is movable between an upright position and a folded position relative to the seat;
  a first anchor coupled to the seatback;
  a second anchor coupled to the mounting bracket, wherein the first anchor and the second anchor each comprise a base portion and a body portion; and
  a flexible member having a first end coupled to the first anchor and a second end coupled to the second anchor such that the flexible member extends between the first anchor and the second anchor, wherein the body portion of the first anchor defines a first aperture that receives the first end of the flexible member, wherein a position of the first end of the flexible member within the first anchor changes as a function of an angular relationship between the seat and the seatback, wherein a contour of the flexible member changes as a function of the angular relationship between the seat and the seatback, wherein the body portion of the second anchor defines a second aperture that receives the second end of the flexible member, wherein the folded position of the seatback corresponds to a minimum contour of the flexible member, and wherein the flexible member is received within a side bolster of the seatback, and wherein the contour of the flexible member influences a compressibility of the side bolster of the seatback.

13. The vehicle seating assembly of claim 12, wherein the body portion of the first anchor is rotatable relative to the base portion of the first anchor.

14. The vehicle seating assembly of claim 12, wherein the first aperture is oblong in shape.

15. The vehicle seating assembly of claim 14, wherein a position of the first end of the flexible member relative to the first aperture is adjusted as the angular relationship between the seat and the seatback is adjusted.

16. The vehicle seating assembly of claim 12, wherein the body portion of the second anchor is rotatable relative to the base portion of the second anchor.

17. The vehicle seating assembly of claim 12, wherein the folded position of the seatback aligns the flexible member substantially alongside a frame of the seatback.

18. The vehicle seating assembly of claim 17, wherein the flexible member is positioned rearward of a forward edge of the frame of the seatback along a length of the flexible member when the seatback is in the folded position.

* * * * *